E. R. CALTHROP.
PARACHUTE.
APPLICATION FILED APR. 19, 1918.

1,291,762.

Patented Jan. 21, 1919.
2 SHEETS—SHEET 1.

Everard Richard Calthrop
INVENTOR

Attorney

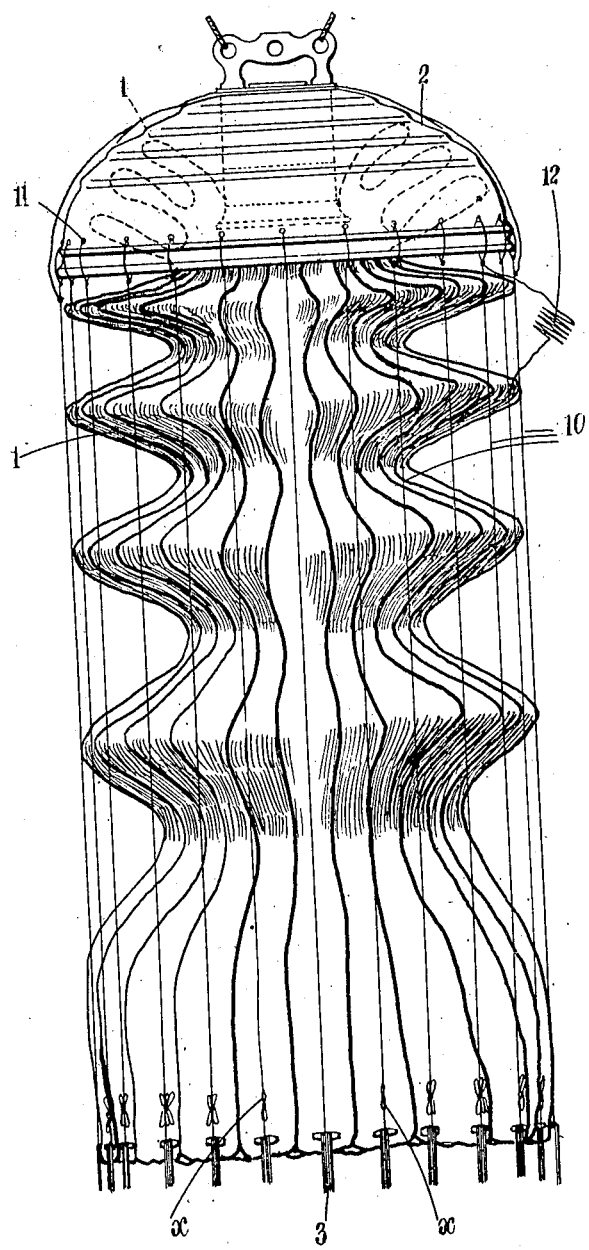

UNITED STATES PATENT OFFICE.

EVERARD RICHARD CALTHROP, OF LONDON, ENGLAND, ASSIGNOR TO E. R. CALTHROP'S AERIAL PATENTS, LIMITED, OF LONDON, ENGLAND.

PARACHUTE.

1,291,762.

Specification of Letters Patent.　　Patented Jan. 21, 1919.

Application filed April 19, 1918.　Serial No. 229,628.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

This invention has reference to parachutes adapted to be carried by aerial craft to afford a ready means whereby the pilot may descend safely to the ground in an emergency.

More particularly the invention relates to devices of the kind in which the parachute is compactly nested within or on a container or support, from which it is freed on the application of the load in such a manner that, the folds or plaits of the parachute body are released successively from the periphery toward the center in ordered sequence, so as to insure the trapping of a column of air and thereby render certain the complete or full expansion of the parachute body.

The use of launching devices of this kind have demonstrated that a parachute when released therefrom opens practically instantaneously, and the load is brought slowly and safely to the ground. It is however conceivable that this rapid expansion of the parachute in immediate proximity to the aircraft from which it is released might, in some circumstances, prove rather a disadvantage than otherwise, for example, in the case of the airship or other craft bursting into flame from any cause, the parachute might be damaged before it could clear the burning structure, and it is the primary object of the present invention to provide a parachute launching device which while insuring the eventual certain opening of the parachute body to support the load, shall refer the complete opening and expansion of the parachute for a sufficient time to enable it to fall rapidly for a sufficient distance to be well clear of the aircraft from which it is released.

With this end in view and such others as may hereinafter appear or are incidental thereto my invention may be said to comprise rupturable elements or tapes for controlling the mouth of the parachute body and therefore the expansion of the parachute so as to enable the fall of the parachute to be regulated, the preliminary fall or high speed drop being of a predetermined character, and the after descent or drop being subject to retardation by the subsequent full expansion of the parachute body owing to the automatic action of rupturable members for releasing and allowing of the complete opening and expansion of the mouth of the said body.

I will now describe my invention with reference to the accompanying drawings in which:—

Fig. 2 illustrates the initial operation of the device shown in Fig. 1 when the load is applied.

Figure 1:
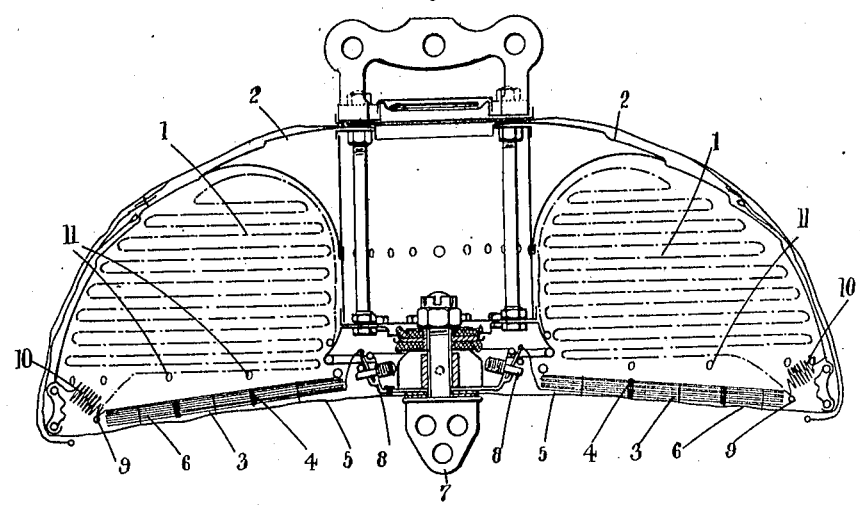
Figure 1 represents a vertical section through a parachute launching device embodying the present invention.

Referring now to Fig. 1 the parachute body 1 is symmetrically folded and plaited and nested within the spun metal container 2. The tapes 3 of which the rigging of the parachute is composed are arranged in packs held together by the rubber friction bands 4 retained in position upon the bottom fabric cover 5 by the light breaking pieces 6. The respective ends of the rigging tapes are secured to the detachable center bolt 7 as at 8 and to the peripheral edge of the parachute body 1 as at 9.

To the edge of the container 2 I secure a number of light and easily rupturable threads, cords or the like 10 which are passed through holes 11 in the container 2, the opposite ends of said threads being attached to the eyelets in the periphery of the parachute body which connect with the rigging tapes 3. To hold the nested parachute and its rigging within the container 2 and to prevent its premature displacement, I may secure a number of light threads across the mouth of said container adapted to be broken when the load is applied, as will be readily understood from the following description of the operation of the device.

Assuming the parts to be in the position illustrated in Fig. 1, and the pilot to be attached through a shock absorber and harness to the detachable center bolt 7, when he throws himself from the aircraft his weight will first detach the lower cover 5 and center bolt 7 from the container 2, the rigging tapes 3 will be extended, and the periphery of the parachute body 1 drawn out of the container. Now it will be seen on referring to Fig. 2 that as this occurs the threads or cords 10 will be extended into a straight line with the rigging tapes 3 under the load of the falling aviator, and they will thus hold the mouth of the parachute body 1 in a circle only slightly less than the diameter of the container 2, so insuring the entry of air to the interior of the parachute to insure its eventual complete expansion.

As the rigging tapes 3 becomes taut the threads 10 will of course snap under the strain exerted on them by the falling load, thus automatically releasing the mouth of the parachute from their restraining influence and allowing the whole parachute body to expand to its full extent to safely support its load during the remainder of its descent to the ground.

It may be desirable that the aforesaid cords 10 should not snap simultaneously but that their breaking should be de-synchronized in order that the combined stress of breaking shall not exert unnecessary strain upon the shock absorber which is located (as hereinafter described) between the parachute and the pilot, and this may be effected by making them of varying lengths and looping them as shown at $x$ (Fig. 2) and other similar cords or threads as shown at 12 may be provided between the container 2 and the other folds or plaits of the parachute body 1 nearer the center, so that as the parachute body leaves the container said threads 12 will operate to cause it to be withdrawn in a more or less cylindrical form so as to entrap a longer column of air.

The distance the parachute will drop before completely opening can be regulated by increasing the diameter of the container to provide a more or less rapid opening, and by reducing said diameter to provide a more or less retarded opening of the parachute body, or alternatively the aforesaid easily rupturable cords, instead of being attached to the edge of the above mentioned container, may be secured thereto nearer the center thereof. It will of course be apparent that if the diameter of the container be reduced, its depth must be increased to afford sufficient capacity to receive the nested parachute body.

It will be observed that in the above described embodiment of my invention the operation of the device is entirely automatic, that is to say when the aviator throws himself from the aircraft the mouth of the parachute will be expanded sufficiently to entrap the requisite amount of air to insure its eventual complete expansion, and after having fallen a distance sufficient to bring the requisite breaking strain upon the easily rupturable cords the parachute body will be free to complete its full expansion.

I claim—

1. A parachute, a container, and means for launching said parachute comprising a plurality of rupturable elements attached to the container and disposed between the container and the mouth of the parachute body to hold the said mouth in a partially extended position, said elements being ruptured by the weight of the falling load to release the mouth and permit of the complete expansion of the parachute body.

2. In a parachute and means for launching the same, the combination, with a nested parachute and a container therefor, of a plurality of easily rupturable elements between the container and the periphery of the parachute body, adapted to restrain the expansion of the said body and to automatically release the mouth thereof to permit of complete expansion of the parachute body.

3. In a parachute and means for launching the same, the combination, with a nested parachute symmetrically folded and plaited and a container adapted to receive the said parachute and upon the application of the load to insure the freeing of the said folds and plaits successively from the periphery toward the center in ordered sequence, of rupturable elements attached to the container and located between the container and the periphery of the parachute body adapted to hold the mouth of the said parachute body in a partially extended position and to automatically release the said mouth by the action of the load in the descent of the parachute.

4. In a parachute and means for launching the same, the combination, with a nested parachute symmetrically folded and plaited and a container adapted to receive the said parachute and upon the application of the load to insure the freeing of the said folds and plaits successively from the periphery and toward the center in ordered sequence, of cords connected at one end to the periphery of the parachute body and at the other end to the container adapted to hold the mouth of the parachute body in a partially extended position and to be ruptured by the weight of the falling load upon the parachute arriving at a predetermined extent of fall in its descent.

5. In a parachute and means for launching the same, the combination, with a nested parachute symmetrically folded and plaited and a container adapted to receive the said parachute and upon the application of the load to insure the freeing of the said folds and plaits successively from the periphery toward the center in ordered sequence, of looped cords of varying lengths having one end connected to the periphery of the parachute body and the other end to the container and similar cords extending between the container and the folds or plaits of the parachute body adapted to hold the mouth of the parachute body in a partially extended position and in approximately cylindrical form and to be ruptured by the weight of the falling load upon the parachute arriving at a predetermined extent of fall in its descent.

6. In a parachute and means for launching the same, the combination, with a nested parachute symmetrically folded and plaited, a rigging composed of tapes arranged in packs and a container adapted to receive the said parachute and upon the application of the load to insure the freeing of the said folds and plaits successively from the periphery toward the center in ordered sequence; of rupturable cords having one end connected to the periphery of the parachute body and the other end to the container and looped so as to present cords of varying lengths.

7. In a parachute and means for launching the same, the combination, with a nested parachute symmetically folded and plaited, a rigging composed of tapes arranged in packs and a container adapted to receive the said parachute and upon the application of the load to insure the freeing of the said folds and plaits successively from the periphery toward the center in ordered sequence; of looped cords of varying lengths having their respective ends connected to the periphery of the parachute body and the container and similar cords extending between the container and the folds or plaits of the parachute body adapted to hold the mouth of the parachute body in a partially extended position and to be ruptured by the weight of the falling load upon the parachute arriving at a predetermined extent of fall in its descent.

EVERARD RICHARD CALTHROP.